United States Patent [19]

Culbertson

[11] 4,097,463
[45] Jun. 27, 1978

[54] PROCESS FOR PREPARING HIGH ORTHO NOVOLAC RESINS

[75] Inventor: Harry M. Culbertson, Belchertown, Mass.

[73] Assignee: Monsanto Company, St. Louis, Mo.

[21] Appl. No.: 758,371

[22] Filed: Jan. 10, 1977

[51] Int. Cl.$^2$ .............................................. C08G 8/10
[52] U.S. Cl. ................................ 260/57 A; 260/59 R
[58] Field of Search ..................................... 260/57 A

[56] References Cited

U.S. PATENT DOCUMENTS

| 3,332,911 | 7/1967 | Huck | 260/57 A |
| 3,476,707 | 11/1969 | Culbertson et al. | 260/57 A |
| 3,485,797 | 12/1969 | Robins | 260/57 |

OTHER PUBLICATIONS

Partansky, Am. Chem. Soc. Preprints, 1967, pp. 115–124.
Fraser et al., J. of Appl. Chem., 1957, pp. 676–688.

*Primary Examiner*—Howard E. Schain
*Attorney, Agent, or Firm*—Joseph S. Nelson; William J. Farrington; James C. Logomasini

[57] ABSTRACT

The invention relates to an improved process for preparing very high ortho novolac resins, said process including reacting phenol and formaldehyde in the presence of a divalent electropositive metal oxide, hydroxide or salt and a strong acid or salts of said metals wherein the improvement comprises conducting said reaction under anhydrous conditions with particular divalent electropositive metal ion combinations.

7 Claims, No Drawings

PROCESS FOR PREPARING HIGH ORTHO NOVOLAC RESINS

BACKGROUND OF THE INVENTION

Conventional novolac resins, prepared from phenolic compounds such as phenol and a source of formaldehyde, in the presence of strong acid catalysts such as sulfuric acid or hydrochloric acid or oxalic acid, are characterized by having a preponderance of para/para and ortho/para methylene bridges as illustrated below:

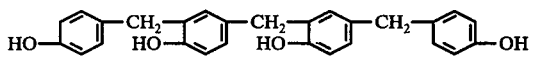

whereas the so-called "high ortho" novolac resins are characterized by having mostly ortho/ortho methylene bridges as illustrated below:

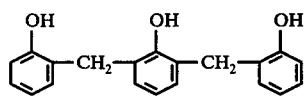

the main advantage of the "high ortho" novolac resins being the much greater speed of cure when reacted with hexamethylenetetramine. "High ortho" novolac resins are commonly prepared by reacting phenolic compounds such as phenol and a source of formaldehyde in the presence of either a divalent metal oxide (e.g. MgO and ZnO) or an organic acid salt of a divalent metal (e.g. zinc acetate or magnesium acetate) catalyst system. This invention relates to the production of so-called "high ortho" novolac resins, which are identifiable as being heat-hardenable phenol-formaldehyde resins of enhanced hardening speed.

U.S. Pat. No. 3,476,707 by H. M. Culbertson has disclosed that in the production of novolac resins, a catalyst system comprising (1) an oxide or hydroxide or organic acid salt of a divalent electropositive metal, and (2) a halogen acid or halide of a divalent electropositive metal, is particularly effecting in promoting "high ortho" orientation in the formation of the resins, with a significant increase in yield and lowering of processing temperature.

Such high ortho novolac resins have ortho orientation of from about 50 to 70% being produced under aqueous conditions.

It has now been discovered that high ortho resins can be produced having very high ortho orientation of from about 80 to 100% in an improved process, the improvement comprising carrying out the reaction under anhydrous conditions. Such very high ortho novolacs have the technical advance of being heat-hardenable with greatly enhanced hardening rates as bonding resins.

SUMMARY OF THE INVENTION

The present invention relates to an improved process for the production of phenol-aldehyde novolac resins of the class which is characterized by having a preponderance of ortho/ortho methylene bridges and which is prepared by an acid aqueous reaction mixture containing a material selected from the group consisting of phenol and metaalkylphenols in molar excess with a source of formaldehyde, conducting said reacting in the presence of a catalyst system comprising in combination:

(A) a divalent electropositive metal compound selected from the group consisting of oxides, hydroxides, organic acid salts, sulfonic acid salts, halogen acid salts and fluoroborate acid salts of said metals or mixtures thereof, and (B) an acid material selected from the group consisting of halogen, fluoroboric, organic and arlyl sulfonic acids and divalent metal salts of said acids or mixtures thereof, said catalyst system being at least partially soluble in said reaction mixture and being present amounts such that the pH of said reaction mixture is maintained at about 4 to 7, whereas the improvement comprises conducting said reacting under anhydrous conditions.

PREFERRED EMBODIMENTS

DIVALENT ELECTROPOSITIVE METAL COMPOUNDS

Divalent electropositive metals of oxides or hydroxides or organic acid salts and halides employed in accordance with the invention, can be calcium (Ca++), barium (Ba++), strontium (Sr++), magnesium (Mg++), zinc (Zn++), manganous (Mn++) manganese and cobaltous (Co++). Halides employed in accordance with the invention can be the chloride, bromide or iodide, the preferred halide being bromide. Halogen acids employed in accordance with the invention can correspondingly be hydrochloride, hydrobromic or hydriodic acid, the preferred acid being hydrobromic acid.

Other acids may be used such as the aryl sulfonic acids, e.g. p-toluene, benzene, xylene, phenol and naphthalene. Organic acids, e.g. acetic, formic, benzoic and lactic acid may be used. Acids such as fluoroboric may be used. Alkyl sulfonic acids, e.g. methane, ethane, etc., trifluoromethanesulfonic may be used.

An example of a particularly effective catalyst system in accordance with the invention is a mixture of zinc oxide and Mg-dibromide. An equally effective alternative to a mixture of oxide and halide is a mixture of the oxide and the appropriate halogen acid, for example, a mixture of zinc oxide and hydrochloric acid. The catalyst system of the invention can comprise a mixture of the oxide or hydroxide or organic acid salt and a halide of different divalent electropositive metals.

I prefer to employ an oxide of a divalent electropositive metal with the halide or halogen acid as specified, rather than an organic acid salt of a divalent electropositive metal with the halide or halogen acid as specified. When an organic acid salt is employed, it is preferred that it be a salt of an aliphatic monocarboxylic acid such as formic acid or acetic acid, however, the salt can also be derived from an aliphatic hydroxycarboxylic acid such as lactic acid, or the salt can be derived from aromatic carboxylic acids such as benzoic acid. Typical salts useful for the purpose of the invention are cadmium formate, zinc acetate, magnesium acetate, manganese acetate, lead acetate and zinc benzoate.

The effectiveness of the catalyst system according to the invention varies with respect to solubility limitations of the oxides or hydroxides or salts and the halides, and with respect to their ability to direct the condensation of the formaldehyde with the phenol or meta-alkylphenol, the relative amount of (1) oxide or hydroxide or salt, and (2) halogen acid or halide as well as the total amount employed varying according to solubility and the necessity to maintain the pH in the pH 4 to pH 7 range. In general, the amount of oxide or hydroxide or salt, calculated as percentage based on the amount of phenol or meta-alkylphenol, is within the range of 0.1 to 2.0%, the preferred amount being within 0.2 to 0.5%; in general the amount of halide, calculated as percentage based on the amount of phenol or meta-alkylphenol, is within the range of 0.05 to 2.0%, the preferred amount being within 0.1 to 1.0%; and in general the amount of halogen acid, calculated as percentage (100% acid) based on the amount of phenol or meta-alkylphenol, is within the range of 0.02 to 1.0%, the preferred amount being within 0.05 to 0.25%.

Meta-alkylphenols as well as phenol, form fast-curing novolac resins when reacted with a source of formaldehyde in accordance with the invention, the phenol and meta-alkylphenol materials including the commercial materials commonly used for the production of such resins. The source of formaldehyde includes conventional formalin solutions for the purpose, as well as materials such as paraformaldehyde, which product formaldehyde under the conditions of the condensation reaction. The molar ratio of phenol to formaldehyde generally lies between 1.20:1 and 2:1, the preferred range being 1.25:1 to 1.45:1. The excess is kept above 1.20:1 in order to prevent gelation and is generally below 2:1 for economic reasons, another factor influencing the choice of molar excess being the molecular weight range generally desired for the resin.

Preparation of "high ortho" novolac resins in accordance with the invention is seen to be essentially a three stage process, the first stage being the formation of methylol derivatives as illustrated by the following:

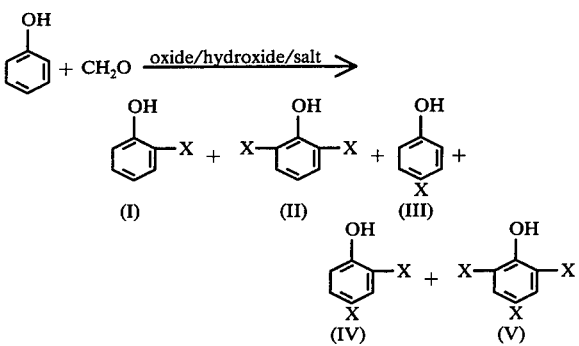

wherein X is CH OH. With the presence of the divalent oxides at pH of pH 4–7, orientation of methylols is predominantly ortho (structures I and II), whereas at pH greater than pH 7, the amount of para substitution increases and an appreciable amount of trimethylol (structure V) derivative is formed. In the second stage the formation of benzyl ethers takes place as illustrated by the following:

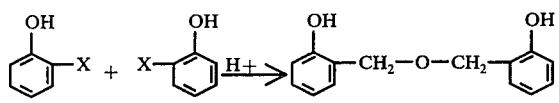

wherein X is CH OH, this reaction taking place only under mildly acidic conditions (pH 4 up to pH 7). In the third stage the formation of methylene bridges takes place through the breaking down of the benzyl ether and reaction with excess phenol which is present, and the condensation of free methylols, as illustrated by the following:

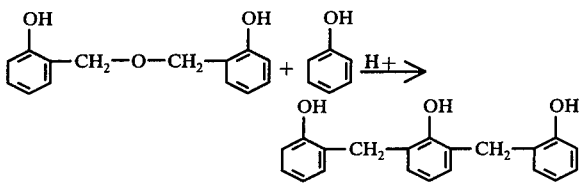

and I consider that it is in the third stage that the divalent metal halide or halogen acid effects a particularly valuable function. The stability of the benzyl ethers is quite pronounced, thus when the prior art organic acid salts or oxides are employed alone, which materials probably are present in the form of the phenate salts, temperatures of up to 160° C. are required. On the other hand, we have found that the presence of the halide or halogen acid catalyzes the decomposition of the benzyl ethers at temperatures as low as 115° C. The pH range specified above is critical in this reaction, since if greater than pH 7, a base-catalyzed condensation takes place, with poor control of orientation and possible gelation at the lower phenol/formaldehyde ratios, whereas if the pH is below pH 4, the orientation is predominantly para, with subsequent loss of reactivity of the resin.

The relation of the above sequence of reactions to the actual processing steps described in the practical examples can be summarized as follows: Stage 1 (methylolation)-initial formalin addition; Stage 2 (ether formation)-dehydration; and Stage 3 (condensation) in all cases a mixture of oxide or hydroxide or salt and halide or sulfonate being present whether the halogen is added in the form of the metal halide of the halogen acid. The role of the metal oxide or hydroxide or salt in the catalyst system is therefore seen to be (1) control of pH in the presence of the strong acids, and (2) increase in the concentration of metal ions which catalyze the initial stage (methylolation) of the reaction and control orientation in the initial and subsequent reaction stages. The role of the halide or sulfonate is seen to (1) increase in the concentration of metal ions, as above, and most importantly, (2) catalyze the decomposition of the intermediate ether at much lower temperatures.

These novolacs have a total ortho orientation of 80 to 95% which distinguishes them from conventional high ortho novolacs which have an ortho orientation of 60 to 80%. The very high ortho orientation results in a much more linear polymer with unusual and valuable properties.

Synthesis of these novolacs is carried out by reacting phenol and formaldehyde at elevated temperatures in the presence of a carefully controlled amount of a catalyst mixture. This catalyst system is a combination of oxides and bromides or oxide, bromides, sulfonates and acetates of certain divalent electropositive metals.

Reaction conditions are conveniently provided by the "entrainer process" in which phenol, xylene and catalyst are charged to the reaction vessel and heated to the desired temperature (about 115°–145° C.) at which formalin is metered in at a rate such that azeotropic distillation of the water maintains the temperature and water content in a range of 0 to 5% by weight based on the total weight of the reaction mixture plus solvent (anhydrous conditions). At the end of formalin addition, the azeotropic solvent and phenol are removed by vacuum distillation until the desired melting point is reached. At this point, the resin is poured from the reaction vessel and cooled. The ortho content is determined by gas chromatography of the dimers as their trimethylsilyl ethers.

The most important factors in obtaining the very high ortho orientations are the following:

1. The use of specific electropositive divalent metal bromides, in particular $MgBr_2$ or sulfonates.
2. The combination of oxides and bromides or sulfonates to control pH in the desired range.
3. A reaction temperature of at least about 115° C. with a corresponding low water content (anhydrous conditions) of the reaction medium, i.e. about 0 to 5% water by weight based on the total weight of the reaction mixture plus solvent.
4. Improved formaldehyde-phenol reaction rates are provided by use of a third component, the acetates of certain electropositive divalent metals such as manganous acetate.

EXAMPLE 1
(ANHYDROUS CONDITIONS)

A two liter resin pot equipped with anchor agitator and azeotropic separator was charged with 1000 g. phenol, 100 g. xylol, 1.5 g. zinc oxide and 1.5 g. magnesium bromide. Ten ml. of 50% formalin was charged and the mixture heated to 125° C. At this point, 490 g. of 50% formalin was metered in slowly over a period of 100 minutes. Water was removed by azeotropic distillation with the xylol layer being returned to the kettle. Rate of addition and rate of water removal were adjusted to maintain a temperature of 125° C. After 40 minutes an additional 1 g. magnesium bromide was added to the batch. The mixture was held at 125° C. for 30 minutes after the formalin addition was complete then heated to 140° C. with distillation. Xylol and excess phenol were removed by vacuum distillation at 140° C. until 28 inches Hg vacuum was reached. The resin was then poured into trays to cool. This gave 977 g. of pale yellow resin which contained 8% free phenol and had a melt point of 93° C. Ortho content from analysis of dimers was 89%.

EXAMPLE 2
(ANHYDROUS CONDITIONS)

A two liter resin pot equipped with anchor agitator and azeotropic separator was charged with 1000 g. phenol, 100 g. xylol and a catalyst mixture consisting of 1.5 g. zinc oxide, 1.5 g. magnesium bromide and 2.0 g. of manganous acetate. Ten ml of 50% formalin was charged and the mixture heated to 125° C. At this point, 490 g. of 50% formalin was metered in slowly over a period of 100 minutes. Water was removed by azeotropic distillation with the xylol being returned to the kettle. Rate of addition and rate of water removal were adjusted to maintain a temperature of 125° C. The mixture was held at 125° C. for 30 minutes after the addition was complete then heated to 140° C. with distillation. Xylol and excess phenol were removed by vacuum distillation to an end condition of 28 inches Hg vacuum at 140° C. The resin was then poured into trays to cool. This gave 958 g. of pale yellow resin which contained 7% free phenol and had a melt point of 94° C. Ortho content was measured at 93% by analysis of the dimer content.

In these examples a series of novolac resins were prepared from mixtures of phenol and 50% w./w. aqueous solution of formaldehyde. The molar ratio of phenol/formaldehyde was varied between 1.25:1 to 1.66:1. In each case all reactants were charged and heated to reflux, the reflux was maintained for three hours, then water and excess phenol distilled to a temperature of 125° C. The resin was refluxed for 1 hour at 125° C. then dehydrated further under vacuum to an end temperature of 125°–135° C. The reactions are carried out under reflux and are defined as hydrous, e.i., having greater than 5% water in the reacting mixture.

EXAMPLE 3
(HYDROUS CONDITIONS)

The phenol/formaldehyde molar ratio was 1.25:1. About 0.26% by weight of ZnO and 0.10% by weight HCl (both on phenol) were catalyst with a pH of about 5.4 at a temperature of 100° C. with reflux for 3 hours. A resin yield of 105% based on phenol was obtained and the ortho content of the novolac resin was found to be about 70%.

EXAMPLE 4
(HYDROUS CONDITIONS)

Example 3 was repeated using a P/F ratio of 1.66:1, a catalyst of 0.53% by weight ZnO and 0.13% by weight of $ZnCl_2$, a pH of 5.3, reflux of 2 hours at 100° C., resin yield of 90%. The ortho content of the resin were found to be about 73%.

EXAMPLES 5 – 8

Example 1 was repeated running to progressively longer condensation periods at 125° C. to produce a range of high ortho novolacs for test purposes versus the resin of Example 4 as shown in Table 1. The resins were cured with hexamethylenetramine at 280° C. versus time in minutes to reach a rubber state as a measure of curing rate.

TABLE 1

| Example | % Ortho | Cure Time |
|---------|---------|-----------|
| 4 | 73 | 2.60 |
| 5 | 82 | 2.06 |
| 6 | 84 | 1.77 |
| 7 | 87 | 1.68 |
| 8 | 89 | 1.50 |

It is evident from the data that the very high ortho resins of the present invention have much faster cure times than the lower ortho novolac resins of the prior art.

EXAMPLES 9 – 12

Example 1 was repeated using various formaldehyde to phenol ratios as indicated in Table 2. Test data is also shown for the various very high ortho novolac resins.

TABLE 2

| Example | Reacted F/P | Mn | Mw | % Ortho |
|---------|-------------|-----|-----|---------|
| 9 | .705 | 432 | 543 | 91 |
| 10 | .735 | 435 | 554 | 93 |
| 11 | .775 | 396 | 470 | 91 |
| 12 | .817 | 420 | 514 | 85 |

It is evident from the data that the molecular weight of the very high ortho novolacs of the present invention are unexpectedly uniform for wide variations in the reacted F/P ratio providing a process that produces very high ortho novolac resins with excellent molecular weight control.

By contrast, the prior art processes, using normal novolac synthesis, produce resins wherein the molecular weight increases sharply with increasing F/P ratio as shown in the analysis of the novolacs of Examples 3–4. Example 3 had a F/P ratio of 0.80 and a Mw of 500 and a Mn of 410. Example 4 had a F/P ratio of 0.60 and a Mw of 400 and a Mn of 350 showing a wide variation in molecular weight versus F/P ratio.

The advantages of anhydrous systems are:

1. Very high ortho resins can be prepared.
2. Shorter time cycle are realized in that all 3 stages proceed simultaneously.
3. Safety is realized in that build up of intermediates occur to give strong exothermix reaction later in process such as in dehydration of resin.

The azeotropic distillation is carried out with an appropriate inert hydrocarbon solvent for the reacting mixture, e.g. xylol, benzene, toluene or other inert hydrocarbon solvents which form azeotropes with water boiling in the range of from about 115° to 145° C.

The ortho content of the novel novolac resins is determined by gas-liquid chromatography of the trimethylsilyl derivatives of the dimeric components; 2,2'-dihydroxydiphenylmethane, 2,4'-dihydroxydiphenylmethane and 4,4'-dihydroxydiphenylmethane. The ortho orientation is obtained as a ratio of the relative amounts of these components as follows:

$$\text{ortho orientation} = \frac{\text{amount of 2,2'} + \frac{1}{2} \text{ amount of 2,4'}}{\text{total amount of dimeric components}}$$

What is claimed is:

1. In a process for the production of phenol-aldehyde novolac resins of the class which is characterized by having a preponderance of ortho/ortho methylene bridges and which is prepared by an acid reaction mixture containing a material selected from the group consisting of phenol and meta-alkylphenols in molar excess with a source of formaldehyde, conducting said reacting in the presence of a catalyst system comprising in combination:

(A) a divalent electropositive metal compound selected from the group consisting of oxides, hydroxides, organic acid salts, sulfonic acid salts, halogen acid salts and fluoroborate acid salts of said metals or mixtures thereof, and (B) an acid material selected from the group consisting of halogen, fluoroboric and sulfonic acids and divalent metal salts of said acids or mixtures thereof, said catalyst system being at least partially soluble in said reaction mixture and being present amounts such that the pH of said reaction mixture is maintained at about 4 to 7, wherein the improvement comprises conducting said reacting under anhydrous conditions wherein said anhydrous conditions are provided by azeotropic distillation and removal of a water phase during said reacting, said reacting being carried out at a temperature of 115° to 145° C. with a molar ratio of phenol to formaldehyde of about 1.2:1 to 2.0:1 providing said novolac resin with about 80 to 95% ortho-ortho methylene bridges said novolac having a weight average molecular weight greater than 400.

2. A process of claim 1, wherein said reacting is carried out by first charging said phenol, said catalysts and an azeotropic solvent followed by metering in said formaldehyde at a rate such that azeotropic distillation of said water maintains the temperature of said reacting at a predetermined temperature.

3. A process of claim 2 wherein the reaction is followed by removal of said phenol and said azeotropic solvent by vacuum distillation until a high ortho novolac resin of a predetermined melting point is formed.

4. A process of claim 1 wherein molar ratio of phenol or meta-alkylphenol to formaldehyde is between 1.25:1 to 1.45:1.

5. A process of claim 1 wherein said anhydrous conditions provides a water content ranging from about 0 to 5% by weight based on the total weight of said reaction mixture and an azeotropic solvent during said reacting and azeotropic distillation.

6. A process of claim 2 wherein said predetermined temperature ranges from about 115° to 145° C.

7. A process of claim 1 wherein said divalent electropositive metals are selected from the group consisting of Ca++, Ba++, Sr++, Mg++, Zn++, Mn++ and Co++.

* * * * *